(12) United States Patent
Yang

(10) Patent No.: US 7,483,281 B2
(45) Date of Patent: Jan. 27, 2009

(54) MULTI-CHANNEL POWER CONVERTER WITH SWITCHING FREQUENCY MODULATION CIRCUIT FOR POWER SAVING

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 243 days.

(21) Appl. No.: 11/463,898

(22) Filed: Aug. 11, 2006

(65) Prior Publication Data

US 2008/0037289 A1 Feb. 14, 2008

(51) Int. Cl.
*H02M 3/335* (2006.01)

(52) U.S. Cl. ............................. 363/71; 363/97
(58) Field of Classification Search .................. 323/267, 323/271, 272, 283, 284; 363/65, 71, 72, 363/95, 97
See application file for complete search history.

(56) References Cited

U.S. PATENT DOCUMENTS

| 6,545,882 | B2 | 4/2003 | Yang |
| 6,781,356 | B1 | 8/2004 | Yang et al. |
| 7,012,819 | B2 * | 3/2006 | Feldtkeller ............... 363/21.01 |
| 7,102,339 | B1 * | 9/2006 | Ferguson .................... 323/284 |
| 7,242,168 | B2 * | 7/2007 | Muller et al. ............... 323/222 |
| 7,313,004 | B1 * | 12/2007 | Yang et al. ............... 363/21.02 |
| 2007/0096710 | A1 * | 5/2007 | Nguyen et al. .............. 323/284 |
| 2008/0084723 | A1 * | 4/2008 | Balakrishnan et al. ........ 363/97 |

* cited by examiner

*Primary Examiner*—Jeffrey L Sterrett
(74) *Attorney, Agent, or Firm*—Jianq Chyun IP Office

(57) ABSTRACT

The present invention provides a control circuit for a multi-channel power converter to save power at light load. The control circuit comprises a modulation circuit and an oscillation circuit to modulate the switching frequency of switching signals for power saving. The modulation circuit generates a modulation signal in response to a first feedback signal and a second feedback signal. The oscillation circuit is coupled to the modulation circuit to control a switching frequency of switching signals in accordance with the modulation signal. The switching frequency of the first switching signal can be linearly decreased in response to the decrease of the load when the second switching signal is enabled. The first switching signal can be bursted for further power saving once the second switching signal is disabled.

10 Claims, 3 Drawing Sheets

MULTI-CHANNEL POWER CONVERTER WITH SWITCHING FREQUENCY MODULATION CIRCUIT FOR POWER SAVING

BACKGROUND OF THE INVENTION

1. Field of the Invention

The present invention generally relates to power converters, and more particularly, to a control circuit of switching power converters.

2. Description of Related Art

Multi-channel power converters are used to convert an unregulated power source to regulated voltage and/or current sources. The control circuit of the multi-channel power converter generates switching signals for the regulation. The duty cycle of switching signals are modulated in accordance with the output of the power converter. The synchronization of switching signals is required to reduce the switching noise and EMI (electrical and magnetic interference). However, the synchronization of the switching produces higher power consumption at the light load and no load conditions. In recent development, many control circuits have been proposed for power converter to save power losses at light load condition, such as "PWM controller having off-time modulation for power converter" by Yang, U.S. Pat. No. 6,545,882; "PWM controller having a modulator for saving power and reducing acoustic noise" by Yang, et al, U.S. Pat. No. 6,781,356. The switching frequency of these prior arts is varied in response to the change of the load, which causes the difficulty for the control circuit to synchronize switching signals.

SUMMARY OF THE INVENTION

The present invention is directed to a control circuit for a multi-channel power converter to control the switching frequency of switching signals for power saving.

The present invention provides a control circuit for a multi-channel power converter to save power at light load. The multi-channel power converter includes a first transformer controlled by a first switching signal to produce a first output of the power converter. A second transformer is controlled by a second switching signal to produce a second output of the power converter. The control circuit is coupled to the output of the power converter to generate the first switching signal and the second switching signal in response to a first feedback signal and a second feedback signal respectively. The control circuit comprises a modulation circuit and an oscillation circuit to modulate the switching frequency of switching signals for saving power. The modulation circuit generates a modulation signal in response to the first feedback signal and the second feedback signal. The oscillation circuit is coupled to the modulation circuit to control the switching frequency of the first switching signal and the second switching signal in accordance with the modulation signal. The switching frequency of the first switching signal is linearly decreased in response to the decrease of the load when the second switching signal is enabled. The first switching signal can be bursted for further power saving once the second switching signal is disabled.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE PREFERRED EMBODIMENT

Figure 1:
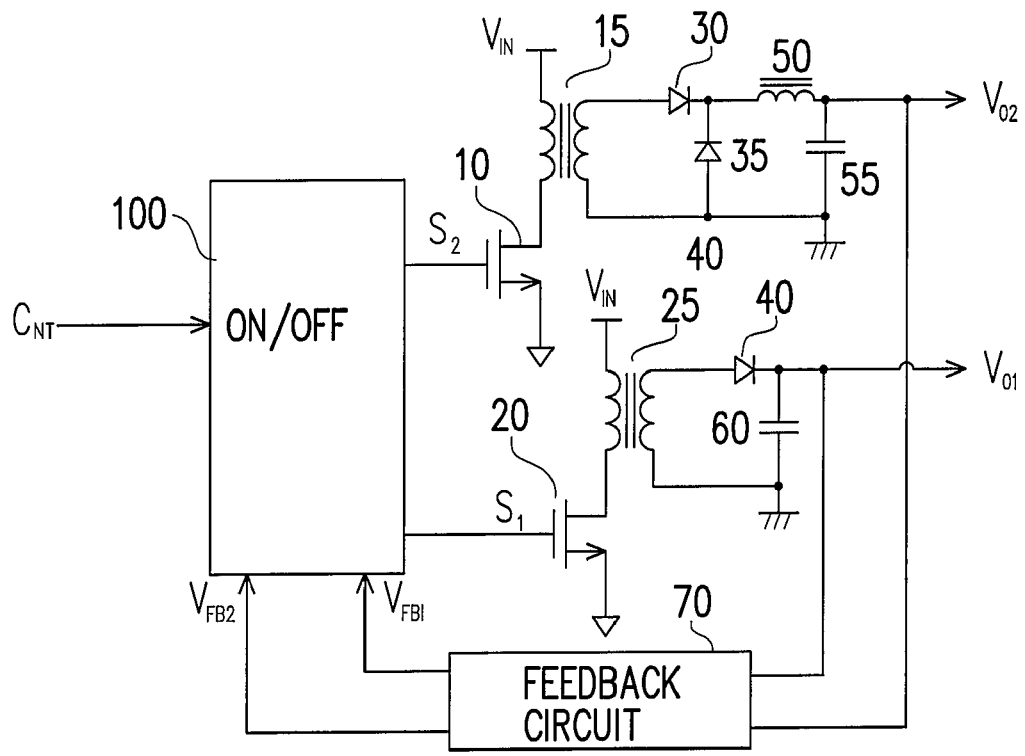
FIG. 1 shows an example circuit of a multi-channel power converter.

FIG. 1 shows a power converter with two switching channels. The first channel is a flyback converter for standby power supply. It includes a transformer 25 controlled by a switching signal $S_1$ through a transistor 20 to produce an output $V_{O1}$ at the output of the power converter. The second channel is a forward converter including a transformer 15. The transformer 15 is controlled by a switching signal $S_2$ through a transistor 10 to generate another output $V_{O2}$ at the output of the power converter. The output $V_{O2}$ can be switched on/off by an input signal $C_{NT}$. The input signal $C_{NT}$ is connected to a control circuit 100 to enable or disable the switching signal $S_2$. The control circuit 100 is further coupled to the output of the power converter to generate the switching signal $S_1$ and the switching signal $S_2$ in response to a feedback signal $V_{FB1}$ and a feedback signal $V_{FB2}$ respectively. The feedback signal $V_{FB1}$ and the feedback signal $V_{FB2}$ are produced by a feedback control circuit 70. The feedback control circuit 70 is coupled to the output of the power converter to provide error-amplifiers and isolations for the feedback control of the power converter. The feedback signal $V_{FB1}$ and the feedback signal $V_{FB2}$ are generated in accordance with outputs $V_{O1}$ and $V_{O2}$.

Figure 2:
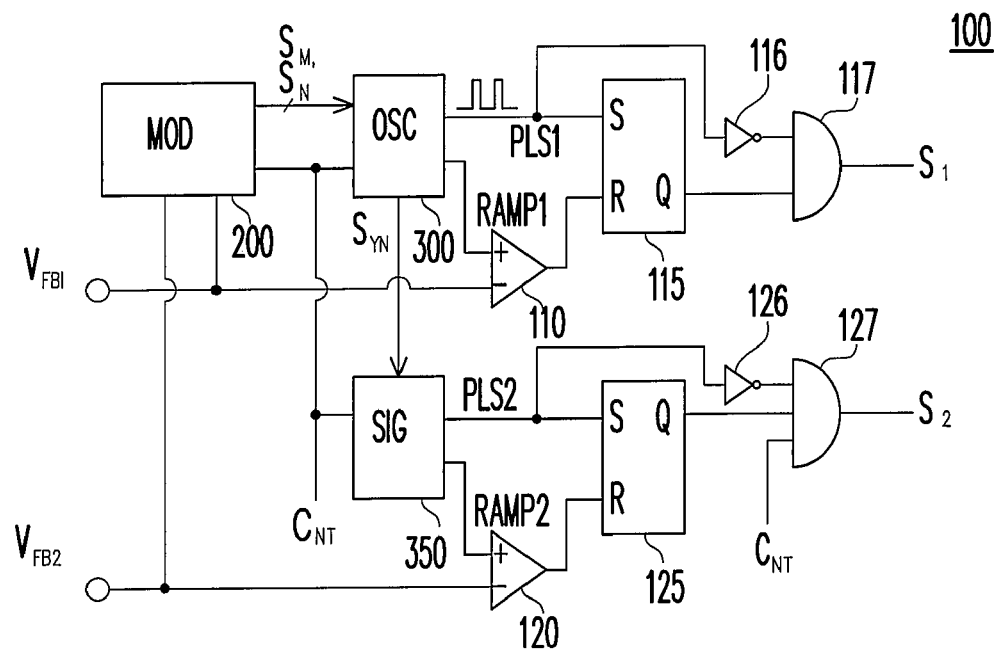
FIG. 2 shows a control circuit of a multi-channel power converter according to an embodiment of the present invention.

FIG. 2 shows a control circuit 100 according to an embodiment of the present invention. The control circuit 100 comprises a modulation circuit 200 and an oscillation circuit 300 for power saving. The modulation circuit 200 is used for generating a modulation signal $S_M$ and a burst signal $S_N$ in response to the feedback signal $V_{FB1}$ and the feedback signal $V_{FB2}$. The burst signal $S_N$ is enabled when the modulation signal $S_M$ is lower than a burst-threshold. An input terminal ON/OFF of the control circuit 100 receives the input signal $C_{NT}$. The switching signal $S_2$ is enabled when the input signal $C_{NT}$ is enabled. The oscillation circuit 300 is coupled to the modulation circuit 200 to generate an oscillation signal PLS1 in accordance with the modulation signal $S_M$. The oscillation signal PLS1 is connected to enable a S/R flip-flop 115. A comparator 110 is used to disable the S/R flip-flop 115 in response to the comparison of the feedback signal $V_{FB1}$ and a ramp signal RAMP1. The oscillation circuit 300 generates the ramp signal RAMP1. The output of the S/R flip-flop 115 is connected to an input of an AND gate 117. Another input of the AND gate 117 is coupled to the oscillation signal PLS1 via an inverter 116. The output of the AND gate 117 generates the switching signal $S_1$.

The oscillation circuit 300 further generates a synchronous signal $S_{YN}$ connected to a signal generator 350 to generate a pulse signal PLS2 and a ramp signal RAMP2. Therefore, the pulse signal PLS2 is synchronized with the oscillation signal PLS1. The pulse signal PLS2 is connected to enable a S/R flip-flop 125. A comparator 120 is used to disable the S/R flip-flop 125 in response to the comparison of the feedback signal $V_{FB2}$ and the ramp signal RAMP2. The output of the S/R flip-flop 125 is connected to an input of an AND gate 127. Another input of the AND gate 127 is coupled to the pulse signal PLS2 via an inverter 126. The third input of the AND gate is linked to the input signal $C_{NT}$. Therefore, the output of the AND gate 127 will generate the switching signal $S_2$ when the input signal is enabled. The oscillation signal PLS1 thus controls the switching frequency of the switching signal $S_1$ and the switching frequency of the switching signal $S_2$. The switching signal $S_2$ is synchronized with the switching signal $S_1$.

Figure 3:
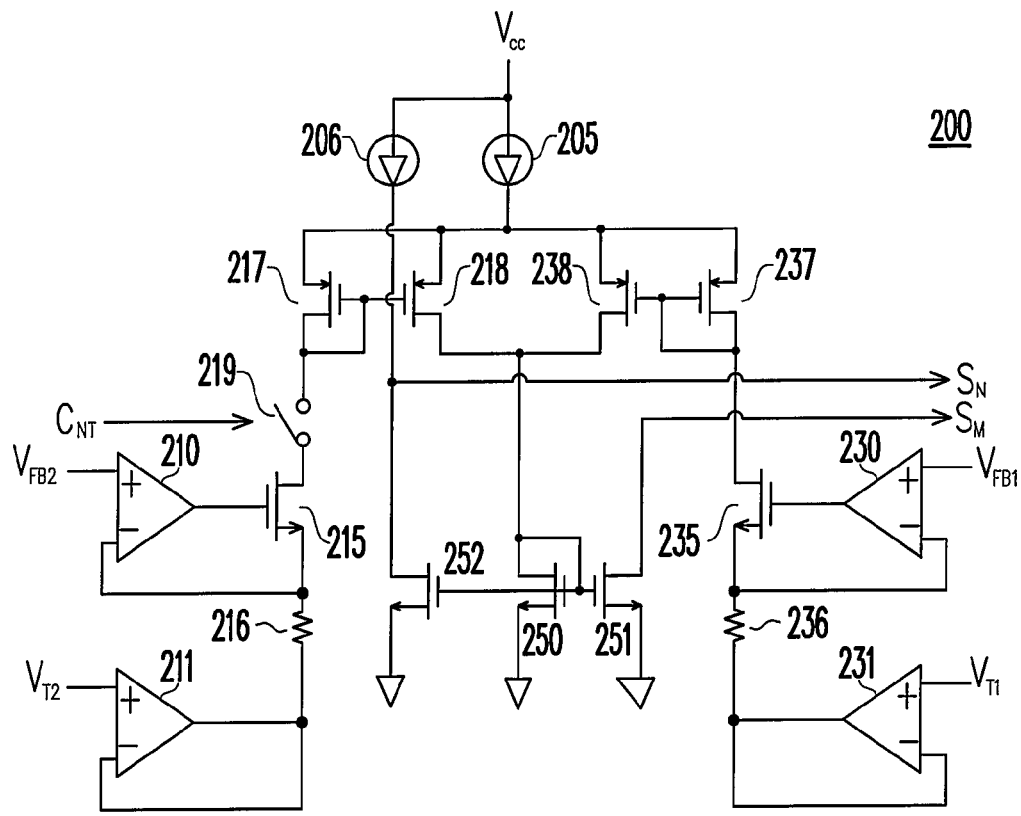
FIG. 3 is a modulation circuit according to an embodiment of the present invention.

FIG. 3 is a modulation circuit 200 according to an embodiment of the present invention. An operational amplifier 230, an operational amplifier 231, a resistor 236 and a transistor 235 form a first voltage-to-current converter to generate a first current signal when the feedback signal $V_{FB1}$ is higher than a first threshold $V_{T1}$. An operational amplifier 210, an operational amplifier 211, a resistor 216 and a transistor 215 form a second voltage-to-current converter to generate a second current signal when the feedback signal $V_{FB2}$ is higher than a second threshold $V_{T2}$. The first threshold $V_{T1}$ and the second threshold $V_{T2}$ are thresholds for the light load. Transistors 237 and 238 form a first current mirror to generate a third current signal in response to the first current signal. Transistors 217 and 218 form a second current mirror to receive the second current signal via a switch 219. The on/off of the switch 219 is controlled by the input signal $C_{NT}$. Then the second current mirror generates a fourth current signal in response to the second current signal when the input signal $C_{NT}$ is enabled. The third current signal connected to the fourth current signal is transmitted to a third current mirror. Transistors 250, 251 and 252 form the third current mirror to generate a fifth current signal and the modulation signal $S_M$. Therefore, the modulation signal $S_M$ is decreased in response to the decrease of both the feedback signal $V_{FB1}$ and the feedback signal $V_{FB2}$.

The fifth current signal is compared with a constant current 206 to generate the burst signal $S_N$ when the fifth current signal is lower than the constant current 206. The constant current 206 represents the burst-threshold. The burst signal $S_N$ is produced to avoid acoustic noise and provide additional power saving. A constant current 205 is utilized to provide the current to the first current mirror and the second current mirror. Therefore, the constant current 205 limits the maximum value of the modulation signal $S_M$.

Figure 4:
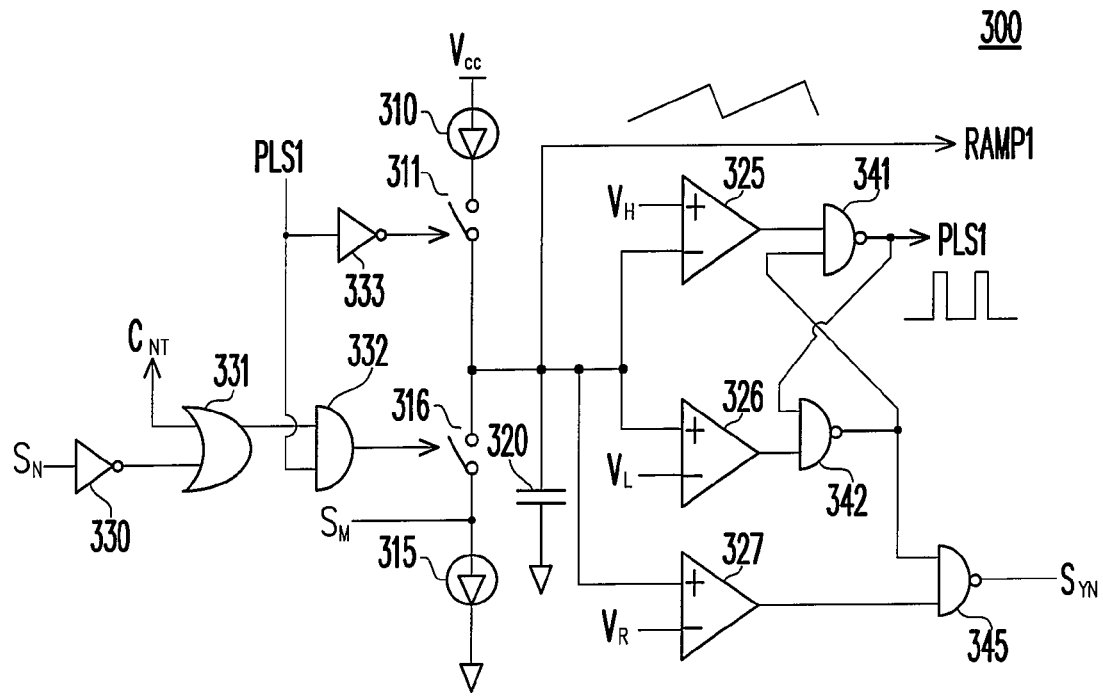
FIG. 4 is an oscillation circuit according to an embodiment of the present invention.

FIG. 4 is a oscillation circuit 300 according to an embodiment of the present invention. A constant current 310 through a switch 311 charges a capacitor 320. The capacitor 320 is discharged via a switch 316. A comparator 325 having a trip-point voltage $V_H$ and a comparator 326 having a trip-point voltage $V_L$ are connected to the capacitor 320. The outputs of comparators 325, 326 are connected to a latch circuit formed by NAND gates 341, 342. The oscillation signal PLS1 is generated at the output of the NAND gate 341. The ramp signal RAMP1 is generated at the capacitor 320. The oscillation signal PLS1 is further coupled to control the switch 311 via an inverter 333. The switch 316 is controlled by an AND gate 332. The oscillation signal PLS1 is connected to the input of the AND gate 332. Another input of the AND gate 332 is tied to an OR gate 331. The input of the OR gate 331 is the input signal $C_{NT}$. Another input of the OR gate 331 is coupled to the burst signal $S_N$ through an inverter 330. A constant current 315 is connected to the switch 316. Furthermore, the modulation signal $S_M$ is connected to the switch 316 for discharging the capacitor 320. Therefore, the discharge of the capacitor 320 will also be controlled by the burst signal $S_N$ when the input signal $C_{NT}$ is disabled. The constant current 315 associated with the constant current 310 determine the minimum frequency of the oscillation signal PLS1. The constant current 315 associated with the constant current 205 as shown in FIG. 3 control the maximum frequency of the oscillation signal PLS1. A comparator 327 is connected to capacitor 320 for generating the synchronous signal $S_{YN}$ when the ramp signal RAMP1 is higher than a threshold $V_R$. The synchronous signal $S_{YN}$ is generated at the output of an AND gate 345. The inputs of the AND gate 345 are connected to the comparator 327 and NAND gate 342 respectively.

Figure 5:
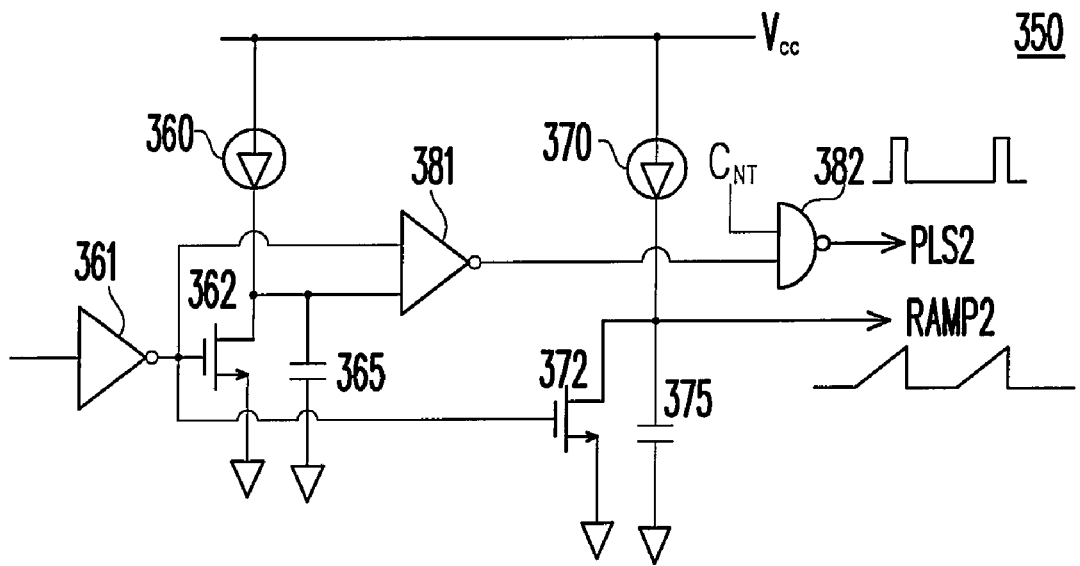
FIG. 5 shows a signal generator according to an embodiment of the present invention.

FIG. 5 shows a schematic circuit of a signal generator 350 according to an embodiment of the present invention. A constant current 360, a capacitor 365, a transistor 362 and an NOR gate develop a one-shot circuit to generate the pulse signal PLS2 in response to the rising edge of the synchronous signal $S_{YN}$. The synchronous signal $S_{YN}$ is coupled to the transistor 362 through an inverter 361. The pulse signal PLS2 is generated at the output of an AND gate 382. The inputs of the AND gate 382 are connected by the input signal $C_{NT}$ and the output of the NOR gate 381. A constant current 370, a capacitor 375 and a transistor 372 develop a ramp signal generator to generate the ramp signal RAMP2 in response to the enable of the synchronous signal $S_{YN}$. The transistor 372 is coupled to the synchronous signal $S_{YN}$ via the inverter 361.

Figure 6:
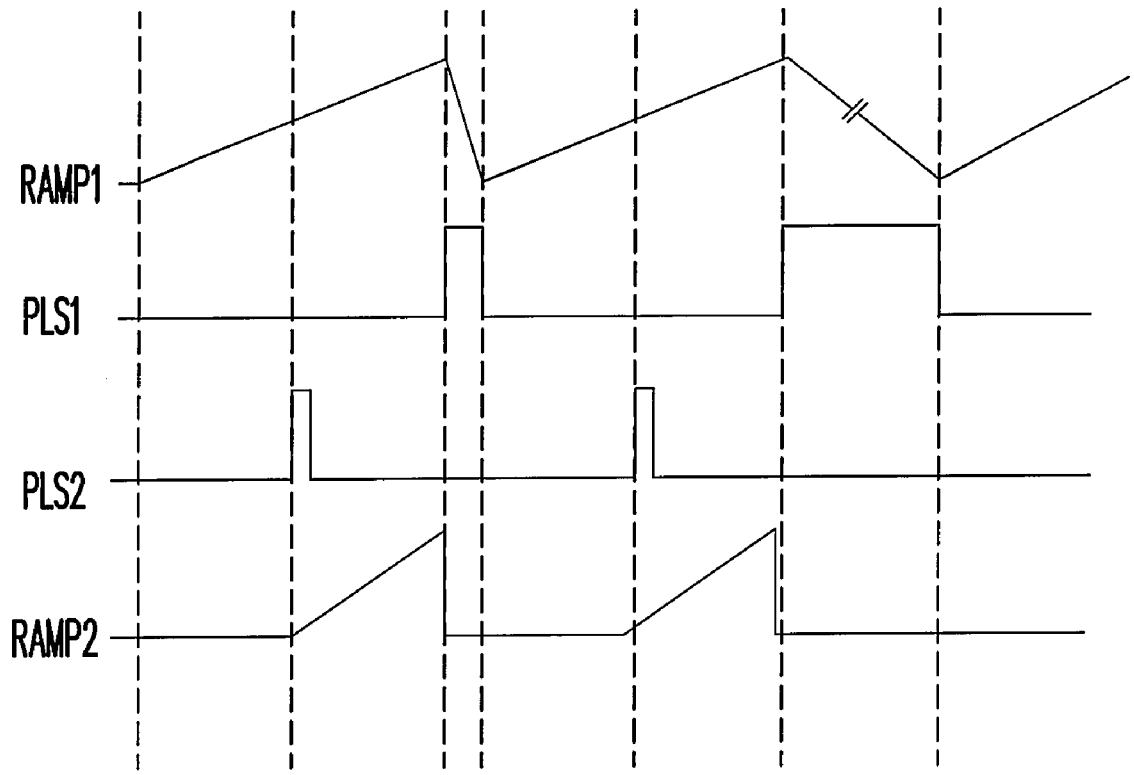
FIG. 6 shows signal waveforms of the control circuit according to an embodiment of the present invention.

FIG. 6 shows signal waveforms of the oscillation signal PLS1, the pulse signal PLS2 and ramp signals RAMP1, RAMP2. The switching frequency of the switching signal $S_1$ and the switching signal $S_2$ is modulated in response to the modulation signal $S_M$ when the input signal $C_{NT}$ is enabled. The switching frequency of the switching signal $S_1$ is modulated in response to the modulation signal $S_M$ and the burst signal $S_N$ once the input signal $C_{NT}$ is disabled. The maximum on time of switching signals $S_1$ and $S_2$ are fixed. Increasing the off time of switching signals $S_1$ and $S_2$ will decrease the switching frequency of switching signals $S_1$ and $S_2$.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A control circuit, for a multi-channel power converter, the multi-channel power converter comprising a first transformer controlled by a first switching signal to produce a first output of the power converter; a second transformer controlled by a second switching signal to produce a second output of the power converter; and the control circuit coupled to the first and second outputs of the power converter to generate the first switching signal and the second switching signal in response to a first feedback signal and a second feedback signal respectively; wherein the first feedback signal and the second feedback signal are produced in accordance with the first and second outputs of the power converter, the control circuit comprising:

a modulation circuit, for generating a modulation signal and a burst signal in response to the first feedback signal and the second feedback signal, wherein the burst signal is enabled when the modulation signal is lower than a threshold;

an input terminal, for receiving an input signal, wherein the second switching signal is enabled when the input signal is enabled; and an oscillation circuit, coupled to the modulation circuit, for generating an oscillation signal in accordance with the modulation signal, wherein the oscillation signal is utilized to control a switching frequency of the first switching signal and a switching frequency of the second switching signal, wherein the switching frequency of the first switching signal and the second switching signal is modulated in response to the modulation signal when the input signal is enabled and the switching frequency of the first switching signal is modulated in response to the modulation signal and the burst signal once the input signal is disabled.

2. The control circuit as claimed in claim 1, wherein the modulation signal is decreased in response to a decrease of both the first feedback signal and the second feedback signal.

3. The control circuit as claimed in claim 1, wherein the burst signal is generated to avoid acoustic noise and provide power saving function.

4. The control circuit as claimed in claim 1, wherein a maximum on time of switching signals is fixed and a switching frequency of switching signals are decreased by increasing a off time of switching signals.

5. A control circuit, for a multi-channel power supply, the multi-channel power supply comprising a first transformer controlled by a first switching signal to produce a first output of a power converter; a second transformer controlled by a second switching signal to produce a second output of the power converter; and the control circuit coupled to the first and second outputs of the power converter to generate the first switching signal and the second switching signal in response to a first feedback signal and a second feedback signal respectively; wherein the first feedback signal and the second feedback signal are produced in accordance with the first and second outputs of the power converter; the control circuit comprising:

a modulation circuit, for generating a modulation signal in response to the first feedback signal and the second feedback signal; and an oscillation circuit, coupled to the modulation circuit, for controlling a switching frequency of the first switching signal and a switching frequency of the second switching signal in accordance with the modulation signal, wherein the switching frequency of the first switching signal is decreased in response to a decrease of the load of the power converter when the second switching signal is enabled and the first switching signal is bursted once the second switching signal is disabled.

6. The control circuit as claimed in claim 5, wherein the modulation signal is decreased in response to a decrease of both the first feedback signal and the second feedback signal.

7. The control circuit as claimed in claim 5, wherein a maximum on time of switching signals is fixed and a switching frequency of switching signals is decreased by increasing a off time of switching signals.

8. A control circuit, for a power converter, the power converter comprising a first transformer controlled by a first switching signal to produce a first output of the power converter; a second transformer controlled by a second switching signal to produce a second output of the power converter; and the control circuit coupled to the first and second outputs of the power converter to generate the first switching signal and the second switching signal in response to a first feedback signal and a second feedback signal respectively; wherein the first feedback signal and the second feedback signal are produced in accordance with the first and second outputs of the power converter; the control circuit comprising:

a modulation circuit, for generating a modulation signal in response to the first feedback signal; and an oscillation circuit, coupled to the modulation circuit, for controlling a switching frequency of the first switching signal in accordance with the modulation signal, wherein the switching frequency of the first switching signal is decreased in response to a decrease of a load of the power converter when a second switching signal is enabled and the first switching signal is bursted once the second switching signal is disabled.

9. The control circuit, for a power converter as claimed in claim 8, wherein the second switching signal is synchronized with the first switching signal when the second switching signal is enabled.

10. The control circuit of the power converter as claimed in claim 8 in which the maximum on time of the first switching signal is fixed; the switching frequency of the first switching signal is decreased by increasing a off time of the first switching signal.

* * * * *